United States Patent [19]
Quayle

[11] Patent Number: 5,912,998
[45] Date of Patent: Jun. 15, 1999

[54] OPTICAL NETWORK WITH REPEATER AT A SPLIT-LEVEL OF THE NETWORK

[75] Inventor: John Alan Quayle, Ipswich, United Kingdom

[73] Assignee: British Telecommunications Public Limited Company, London, United Kingdom

[21] Appl. No.: 08/836,701

[22] PCT Filed: Nov. 22, 1995

[86] PCT No.: PCT/GB95/02754

§ 371 Date: May 19, 1997

§ 102(e) Date: May 19, 1997

[87] PCT Pub. No.: WO96/16490

PCT Pub. Date: May 30, 1996

[30] Foreign Application Priority Data

Nov. 22, 1994 [EP] European Pat. Off. ............. 94308676

[51] Int. Cl.[6] .................................................. H04J 14/08
[52] U.S. Cl. ........................... 385/24; 359/137; 359/143; 359/164; 359/177
[58] Field of Search .................. 385/14, 24; 359/110, 359/121, 123–125, 130, 143, 164–168, 137, 177, 179

[56] References Cited

U.S. PATENT DOCUMENTS

| 4,451,916 | 5/1984 | Casper et al. .............................. 370/16 |
|---|---|---|
| 5,107,361 | 4/1992 | Kneidinger et al. ..................... 359/135 |
| 5,285,305 | 2/1994 | Cohen et al. ............................ 359/110 |
| 5,457,555 | 10/1995 | Moriyama ................................ 359/110 |
| 5,517,519 | 5/1996 | Carbone, Jr. et al. ................... 375/211 |
| 5,550,666 | 8/1996 | Zirngibl .................................. 359/125 |

OTHER PUBLICATIONS

Hornung et al., "Single–Mode Optical Fibre Networks to the Home", International Conference on Communications, Apr. 1990, Atlanta, US, pp. 1563–1571.

Clarke et al., "The Design of a TDMA System for Passive Optical Networks", International Conference on Communications, Apr. 1990, Atlanta, US, pp. 654–658.

Yamauchi et al., "Improved Fibre Transfer and Test System", NTT Review, vol. 6, No. 4, Jul. 1994, Tokyo, JP, pp. 79–84.

*Primary Examiner*—John D. Lee
*Assistant Examiner*—Victoria D. Hao
*Attorney, Agent, or Firm*—Nixon & Vanderhye P.C.

[57] ABSTRACT

An optical network includes a head-end station connected to a plurality of optical network units via an optical fiber network having a plurality of split levels. One level of split is constituted by a n:1 repeater provided with a monitor for ranging and leveling transmissions from the optical network units.

16 Claims, 2 Drawing Sheets

OPTICAL NETWORK WITH REPEATER AT A SPLIT-LEVEL OF THE NETWORK

BACKGROUND OF THE INVENTION

1. Field of the Invention

This invention relates to an optical network.

2. Related Art

Currently, in the United Kingdom, the telecommunications network includes a trunk network which is substantially completely constituted by optical fibre, and a local access network which is substantially completely constituted by copper pairs. In future, it would be highly desirable to have a fixed, resilient, transparent telecommunications infrastructure all the way to customer premises, with capacity for all foreseeable service requirements—or at least to points (e.g. the curb) closer to such customer premises. One way of achieving this would be to create a fully-managed fibre network for the access topography. An attractive option for this is an optical tree access network, such as passive optical networks (PONs) which incorporate single mode optical fibre and no bandwidth-limiting active electronics.

In a PON, a single fibre is fed out from a head-end (exchange), and is fanned out via passive optical splitters at cabinets and distribution points (DPs) to feed optical network units (ONUs). The ONUs can be in customers' premises, or in the street serving a number of customers. The use of optical splitters enables sharing of the feeder fibre and the exchange-based optical line termination (OLT) equipment, thereby giving PONs cost advantages. At present, simplex deployment of PONs is the preferred option, that is to say separate upstream and downstream PONs are provided whereby each customer has two fibres. Although simplex working increases the complexity of the infrastructure due to the two fibres per circuit required, it benefits from a low optical insertion loss (due to the absence of duplexing couplers), and a low return loss, since such systems are insensitive to reflections of less than 25 dBm with separate transmit and receive paths. However, duplex PONs where one single fibre carries traffic in both directions are also possible. Typically, a PON has a four-way split followed by an eight-way split, so that a single head-end fibre can serve up to 32 customers.

In a known arrangement—TPON (telephony over a passive optical network)—a head-end station broadcasts time division frames to all the terminations on the network. The transmitted frames include both traffic data and control data. Each termination recognises and responds to appropriately-addressed portions of the data in the broadcast frames, and ignores the remainder of the frames. In the upstream direction, transmission is by time division multiple access (TDMA) where each termination transmits data in a predetermined timeslot, so that the data from the different terminations are assembled into a TDMA frame of predetermined format.

The present applicant has developed a bit transport system (BTS) for use in a PON which operates using TDMA. The BTS is described in our European patent specifications 318331, 318332, 318333 and 318335.

One feature necessary to such a network is the provision of compensation for the differing delays and attenuations associated with the different distances of the various terminations from the head-end station. To this end, each termination is arranged to transmit a ranging pulse timed to arrive in a respective predetermined portion of the upstream TDMA frame. The head-end station is arranged to monitor the timing, i.e. the-phase and the amplitude of the arrival of the pulse from each of the terminations, and to return servo-control signals to the terminations to retard or advance their transmissions as appropriate, and to adjust their launch power. This ranging and levelling process is particularly important during set-up of a PON system, or when a PON system is upgraded, or when a PON system is returned to use after a fault has been repaired. In such cases, the ranging and levelling process takes a finite time (the round trip delay) which is dependent upon the distance from the head-end station to the terminations. This round trip delay from the terminations to the head-end station and back to the terminations to effect ranging and levelling is known as the dead zone. This is because the dead zone represents the time during which PON customers can get no service as the PON is being used exclusively for ranging and levelling. For a simple PON of the type described above, in which a head-end station is connected to up to 32 terminations over a distance of typically 6–8 km, the dead zone is only 60–80 ms, and this does not represent a major problem.

Recently, however, the PON principle has been expanded to form what is known as the SuperPON concept, in which high power optical amplifiers are used to allow very large, high split PONs to be built. For example, the use of optical amplifiers (such as fibre amplifiers) permits up to 3500 customers to be connected to a single head-end station over distances of up to 200 km. In this case, the dead zone is of the order of 1 ms to 2 ms, and this does give rise to significant loss of service to customers of such a SuperPON.

Unfortunately, optical amplifiers can only be used on a downstream SuperPON, as the use of amplifiers on an upstream SuperPON would cause noise problems resulting from the superposition of amplified stimulated emissions (ASEs) from the amplifiers. One way of providing amplification in an upstream SuperPON is to replace the last level of split (that is to say the level of split nearest the headend) by a repeater. This device converts incoming optical signals to electrical signals, amplifies them, and converts the amplified electrical signals to optical signals for onward transmission. Note that such networks are often loosely referred to as PONs, even though they may include electronic amplification and are not, therefore, strictly speaking, "passive".

SUMMARY OF THE INVENTION

The present invention provides an optical network comprising a head-end station connected to a plurality of optical network units via an optical fibre network having a plurality of split levels, wherein one level of split in the upstream direction is constituted by a n:1 repeater provided with monitoring means for ranging and levelling transmissions from the optical network units.

Preferably the repeater is connected to the head-end station by a single optical fibre. Typically, said single optical fibre has a length of up to 200 km (e.g 100 to 200 km), and the optical network units are spaced from the repeater by distances up to about 8 km.

In a preferred embodiment, the repeater includes n receivers and a transmitter, the transmitter being connected to the head-end station, and each of the receivers being connected to a respective optical fibre forming part of the network between the repeater and the optical network units. Conveniently, the repeater may be provided with a multiplexer for multiplexing signals received by the receivers for transmission to the head-end station by the transmitter, and with supervisory means for monitoring the functions of the receivers, the multiplexer and the transmitter.

Preferably, each receiver is constituted by a pair of parallel receiver boards, and the transmitter is constituted by a pair of parallel transmitter boards. In this case, the supervisory means may be such as to disconnect one of the receiver boards of each pair from its associated optical fibre and to connect the other receiver board of that pair to said optical fibre upon detection of a fault in said one receiver board, and is such as to disconnect one of the transmitter boards from said single optical fibre and to connect the other transmitter board to said single optical fibre on detection of a fault in said one transmitter board.

In another preferred embodiment, the repeater is constituted by a plurality of repeater modules each of which is connected to a single optical fibre leading to the head-end station.

For example, each repeater module may include a plurality of receivers and a transmitter, the transmitter being connected to said single optical fibre, and each of the receivers being connected to a respective optical fibre forming part of the network between the repeater and the optical network units, the arrangement being such that the total number of receivers in the repeater modules equals n. Each repeater module may be provided with a multiplexer for multiplexing the signals received by the receivers of that module for transmission to the head-end station by the associated transmitter, and with supervisory means for monitoring the functions of the associated receivers, the associated multiplexer and the associated transmitter.

Preferably, each receiver is constituted by a pair of parallel receiver boards, and each transmitter is constituted by a pair of parallel transmitter boards. In this case, the supervisory means of each repeater module may be such as to disconnect one of the receiver boards of each associated pair from its associated optical fibre and to connect the other receiver board of that pair to said optical fibre upon detection of a fault in said one receiver board, and is such as to disconnect one of the associated transmitter boards from said single optical fibre and to connect the other transmitter board of that pair to said signal optical fibre on detection of a fault in said one transmitter board.

BRIEF DESCRIPTION OF THE DRAWINGS

A SuperPON incorporating a ranged and levelled repeater constructed in accordance with the invention will now be described in greater detail, by way of example, with reference to the accompanying drawings, in which.

DETAILED DESCRIPTION OF THE EXEMPLARY EMBODIMENTS

Figure 1:
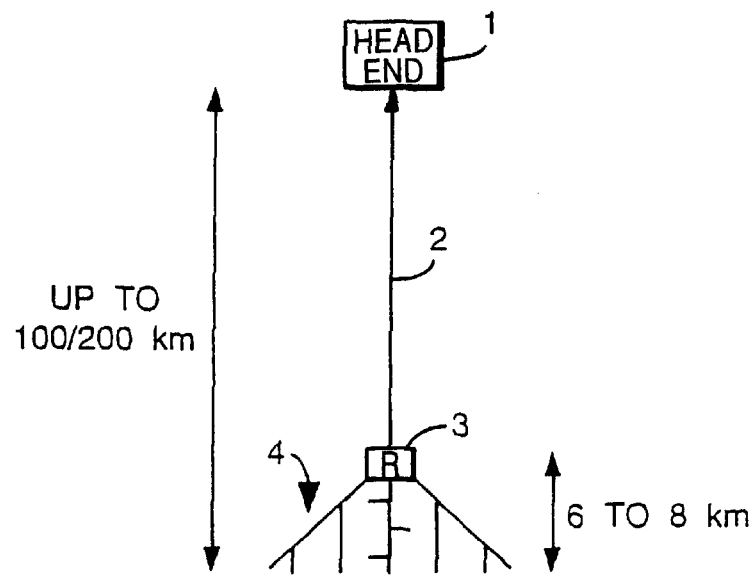
FIG. 1 is a schematic representation of the SuperPON.

Referring to the drawings, FIG. 1 shows a SuperPON having a head-end station 1 connected to a plurality of ONUs (not shown) via a single fibre 2, a repeater 3 and a network 4 (shown schematically) including two or more levels of split. The SuperPON shown is an upstream SuperPON, that is to say it is a simplex network carrying signals from the ONUs to the head-end station 1. A downstream PON is also assumed to be present to carry signals from the head-end station 1 to the ONUs, though not shown in the drawings; though the invention may also be applied to duplex PONs, if desired: Typically, the distance between the head-end station 1 and the repeater 3 lies in the range of from 100 km to 200 km. The SuperPON is arranged to use the BTS.

Figure 2:
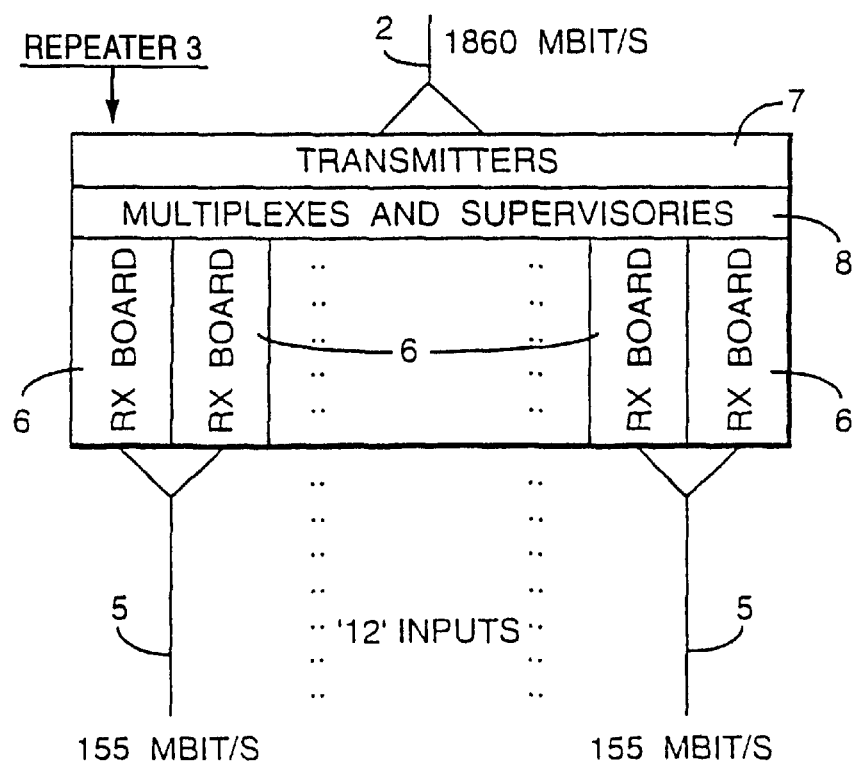
FIG. 2 is a block diagram of the repeater of the SuperPON.

The repeater 3 (see FIG. 2) replaces the last level of split of a standard upstream SuperPON, that is to say the level of split nearest the head-end station 1, the other levels of split being formed by passive optical splitters, in conventional manner. This last level of split is 12:1, so that the repeater 3 connects the single fibre 2 from the head-end station 1 to twelve fibres 5 (only two of which are shown) forming part of the network 4. Each of the fibres 5 carries TDMA traffic at 155 Mbit/s, and the fibre 2 carries traffic at 1860 Mbits.

The repeater 3 includes twenty-four receiver boards 6 which are connected in pairs to the twelve fibres 5. One receiver board 6 of each pair forms a back-up for the other receiver of that pair, thereby providing one-to-one receiver protection for each of the fibres 5. The repeater 3 also includes a transmitter/packetiser block 7 for packetising and transmitting data coming in from the fibres 5. In order to provide one-to-one transmitter protection, the block 7 includes two transmitter/packetiser devices. A multiplexer/supervisories block 8 is positioned between the receiver boards 6 and the block 7. The multiplexer of the block 8 multiplexes the signals from the twelve active receiver boards 6 prior to these signals being packetised and transmitted by the block 7; and the supervisories control the ranging and levelling functions of the repeater (as is described below). Any convenient method of multiplexing may be used over the fibre 2; it is not necessary to follow the TDMA framing used on the fibres 5.

Figure 3:
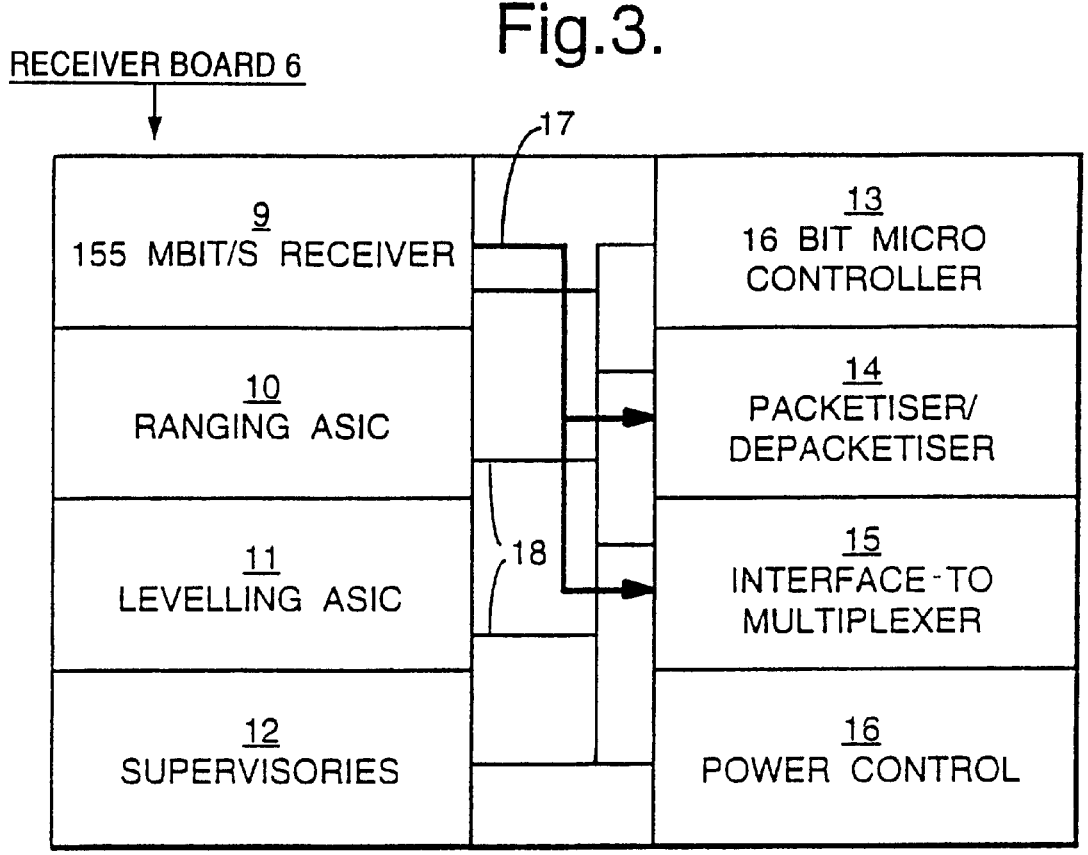
FIG. 3 is a block diagram of a receiver board forming part of the repeater of FIG. 2.

Each receiver board 6 (see FIG. 3) is constituted by a 155 Mbit/s receiver chip 9, a ranging ASIC 10, a levelling ASIC 11, a supervisories chip 12, a 16-bit micro controller chip 13, a packetiser/depacketiser chip 14, an interface to multiplexer chip 15, and a power control chip 16. The chips 9, 14 and 15 are connected together by a high data rate bus 17, and all the chips 9–16 are connected together by a low data rate control bus 18.

The receiver chip 9 of the receiver board 6 receives data signals from its input fibre 5, and transfers this data to the packetiser/depacketiser chip 14 and to the interface to multiplexer chip 15 via the high data rate bus 17. The interface to multiplexer chip 15 interfaces with the multiplexer of the block 8, and the packetiser/depacketiser chip 14 filters out any operations and maintenance (O&M) signals and passes these to the 16-bit micro controller chip 13. The O&M signals are sent regularly from the ONUs (say every nth frame of the BTS), and it is important to prevent these O&M signals being returned to the head-end station in a SuperPON as head-end processing could be overrun under certain problematical situations. Thus, the repeater 3 is effective to carry out the control of O&M signals that is usually carried out by the head-end station of a PON.

The ranging ASIC 10 and the levelling ASIC 11, under the control of the 16-bit micro controller chip 13, carry out the ranging and levelling functions normally carried out at the head-end of a PON. Thus, the ranging ASIC 10 and the levelling ASIC 11 monitor the timing, i.e. the phase and the amplitude of the arrival of the ranging pulses from the ONUs, and return servo-control signals to the ONUs to retard or advance their transmissions as appropriate, and to adjust their launch power. As there is a fixed delay between the repeater 3 and the head-end station 1, the only uncertainty in ranging and levelling arises from the delays between the ONUs and the repeater 3. However, as the network 4 is such that the ONUs are typically 6–8 km from the repeater 3, the dead zone for ranging and levelling is only 60–80 ms, and this does not cause a problem. Here again, therefore, an important control function has been taken over by the repeater 3 from the head-end station 1. The return of these servo-control signals is preferably transmitted from the repeater, on the link 2, to the head-end 1 and then forwarded by the head-end via the downstream PON to the ONUs.

The supervisories chip 12 monitors the functions of the receiver chip 9, the multiplexer of the block 8 and the transmitter of the block 7, and is effective to switch to the paired receiver board 6 if a problem is sensed with its own receiver board. Thus, the receiver boards 6 are paired to have 1:1 redundancy with hot stand-by. The rapid switch over between the two receiver boards 6 of each pair, possibly without loss of service, helps with the identification of faults on the distribution side (that is to say the downstream side of the repeater 3) of the SuperPON. In other words, the supervisories chip 12 can be used to identify faults in parts of the network associated with specific fibres 5. This enables remedial work to be carried out on the faulty branch without having to shut down the entire SuperPON. This is to be contrasted with known SuperPONs which do require complete shutdown for fault eradication. Similarly, the two transmitters of the block 7 have 1:1 redundancy with hot stand-by. Alternatively, the load could be interleaved between the two transmitters so that, if one fails, the other takes on the faulty transmitter's load.

The 16-bit micro controller chip 13 controls the other chips 9–12 and 14–16, and the power control chip 16 controls the power supplies to all the other chips.

Figure 4:
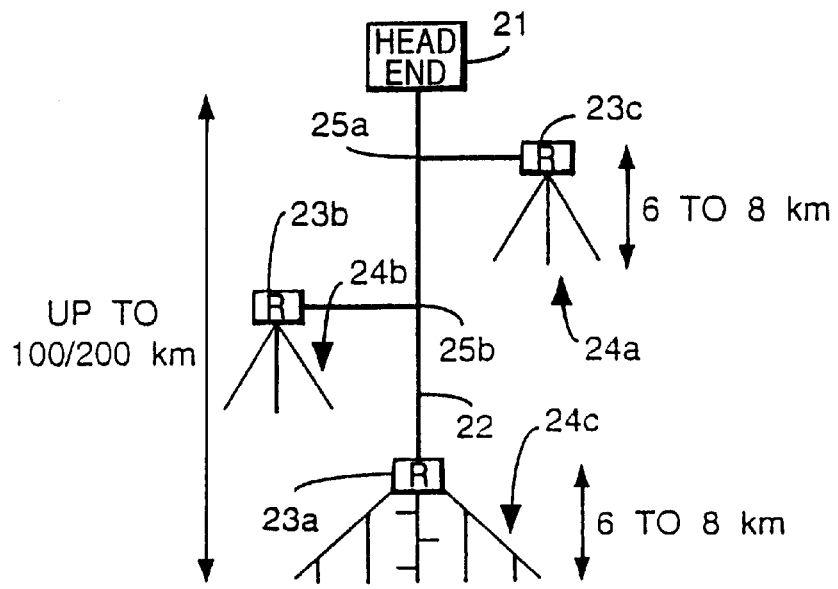
FIG. 4 is a schematic representation of a SuperPON including several repeaters.

FIG. 4 shows a modified form of upstream SuperPON, in which a head-end station 21 is connected to three repeaters 23a, 23b and 23c by a single fibre 22. The repeater 23a is equivalent to the repeater 3 of FIG. 1, in that it is situated between 100 km and 200 km from the head-end station 21. The repeaters 23b and 23c are, however, situated much nearer to the head-end station 21. A respective PON 24a, 24b and 24c is associated with each of the repeaters 23a, 23b and 23c. In this case, the three repeaters 23a, 23b and 23c collectively constitute the final split in the upstream SuperPON, i.e. they provide a distributed repeater function in which, say, the repeater 23a has six pairs of receiver boards (not shown but similar to the receiver boards 6 of FIG. 2), and the repeaters 23b and 23c each have three pairs of receiver boards. Obviously, each of the repeaters 23a, 23b and 23c has a transmitter/packetiser block (not shown but similar to the block 7 of FIG. 2) having two transmitter/packetiser devices for providing one-to-one transmitter protection, and a multiplexer/supervisories block (not shown but similar to the block 8 of FIG. 2). This type of SuperPON, having a distributed repeater function, is suitable for more rural areas of the country, where the customers are more widely spaced. Apart from this distributed repeater function, the embodiment of FIG. 4 works in the same way as that of FIG. 1.

The repeaters 23a, 23b and 23c can be thought of as parts of a single repeater forming the last level of split of the upstream SuperPON (even though the first two repeaters 23a and 23b are joined to the main fibre 22 leading to the head-end station 21 by splitters 25a and 25b respectively). Thus, each of the repeaters 23a, 23b and 23c controls the ranging and levelling functions for its own PON 24a, 24b and 24c. As the dead zone in each of these PONs 24a, 24b and 24c is only of the order of 60–80 ms (the PONs being such that their ONUs are only 6–8 km from their repeaters 23a, 23b and 23c), this does not give rise to significant loss of service to customers of this type of SuperPON. Note however that if the repeaters are located at different distances from the head end and TDMA is used on this part of the network then a ranging and levelling function will need to be provided (either at the repeaters or at the head end) to range and level the part of the network between the head end and the repeaters. Alternatively the link from the repeater (or repeaters) to the head end could itself be part of a separate PON with its own ranging and levelling facilities. This separate PON could be a conventional PON, or one in accordance with the present invention.

It will be apparent that the type of ranged and levelled repeater described above greatly reduces the dead zone in an upstream SuperPON. Moreover, ranging and levelling to the repeater's receiver reduces the power budget of the system, that is to say dynamic range and receiver sensitivity requirements are reduced. Thus, in prior art upstream SuperPONs it is necessary to combine, at the head-end receiver, up to 3500 customer signals, and this leads to the problem of additive noise. By moving the ranging and levelling function downstream to the repeater(s), the number of customers to be dealt with is reduced to 288 per receiver board 6, and this leads to a reduction in the required power budget. Moreover, each of the receiver boards 6 only needs to take account of signals coming in from ONUs at distances of up to 6–8 km, and this leads to the reduction in dynamic range requirements. With reduced dynamic range, it should be possible to consider implementing the system with no levelling. In this case, the receiver boards 6 of the repeaters could be simplified.

Another advantage of using the type of ranged and levelled repeater described above is that the upstream data rate can be far higher than 300 Mbit/s (which is the maximum for normal upstream SuperPONs). This is because each of the twelve branches leading to a repeater can carry 300 Mbit/s, and the data streams can be multiplexed for onward transmission. The advantage of this is that a SuperPON can now offer the same bit rate of 1.2 Gbit/s in both the upstream and downstream directions.

Other advantages of this arrangement are greater flexibility in the link to the head-end station, as the distribution and transport sections of the SuperPON are separated, so that duel parenting of sections of the PON to two or more head-end stations is possible. Also, the filtering of O&M messages by the repeater has the advantage of avoiding overload at the head-end station. A further advantage, particularly with the embodiment of FIG. 4, is the accommodation of temperature changes. Thus, the BTS normally monitors temperature changes by monitoring the ranging pulses in the packet headers, appropriate correction signals being sent to the ONUs when temperature changes are sensed. In this connection, it should be noted that, with a long reach PON, the temperature change which will shift data by one bit is as low as 0.075° C. This temperature monitoring function can, however, only be carried out where there is no overlap of bits from different customers. This overlap of bits is a function of the distance between the customers' ONUs and the monitoring centre. Thus, where this type of repeater is used to monitor ONUs for distances of only up to 6–8 km, there is considerably less chance of overlap of bits from different customers, and so improved temperature monitoring and correction can be accomplished.

What is claims is:

1. An optical network comprising:
   a head-end station connected to a plurality of optical network units via an optical fibre network having a plurality of split levels, wherein one level of split in the upstream direction is constituted by a n:1 repeater provided with monitoring means for ranging and levelling transmissions from the optical network units.

2. An optical network as in claim 1, wherein the repeater is connected to the head-end station by a single optical fibre.

3. An optical network as in claim 2, wherein said single optical fibre has a length of up to 200 km, and the optical network units are spaced from the repeater by distances up to about 8 km.

4. An optical network as in claim 1, wherein:

the repeater includes n receivers and a transmitter, the transmitter being connected to said head-end station, and each of the receivers being connected to a respective optical fibre forming part of the network between the repeater and the optical network units.

5. An optical network as in claim 4, wherein the repeater is provided with a multiplexer for multiplexing signals received by the receivers for transmission to the head-end station by the transmitter.

6. An optical network as in claim 1, wherein the repeater includes a plurality of repeater modules each of which is connected to a single optical fibre leading to the head-end station.

7. An optical network as in claim 6, wherein:

each repeater module includes a plurality of receivers and a transmitter, the transmitter being connected to said single optical fibre, and each of the receivers being connected to a respective optical fibre forming part of the network between the repeater and the optical network units, the arrangement being such that the total number of receivers in the repeater modules equals n.

8. An optical network as in claim 7, wherein each repeater module is provided with a multiplexer for multiplexing the signals received by the receivers of that module for transmission to the head-end station by the associated transmitter.

9. An optical network as in claim 8 wherein the repeater includes supervisory means for monitoring the functions of the receivers, the associated multiplexer(s) and the associated transmitter(s).

10. An optical network as in claim 9, wherein:

each receiver includes a pair of parallel receiver boards, and each transmitter includes a pair of parallel transmitter boards, the supervisory means of each repeater module being adapted to disconnect one of the receiver boards of each associated pair from its associated optical fibre and to connect the other receiver board of that pair to said associated optical fibre upon detection of a fault in said one receiver board, and is adapted to disconnect one of the associated transmitter boards from said single optical fibre and to connect the other transmitter board of that pair to said single optical fibre on detection of a fault in said one transmitter board.

11. A method for organizing and controlling a head-end station connected to a plurality of optical network units via an optical fibre network having a plurality of split levels, said method comprising:

providing at least one level of split in the upstream direction with a n:1 repeater; and ranging and levelling transmissions from the optical network units by monitoring signals received at said at least one level of split.

12. A method as in claim 11 wherein the repeater is connected to the head-end station by a single optical fibre.

13. A method as in claim 11 wherein:

a transmitter is connected to said head-end station, and one of n receivers is connected to a respective optical fibre forming part of the network between the repeater and the optical network units.

14. A method as in claim 13 including multiplexing signals received by the receivers for transmission to the head-end station by the transmitter.

15. A method as in claim 14 including monitoring functions of the receivers, the associated multiplexer(s) and the associated transmitter(s) at the repeater site.

16. A method as in claim 15 wherein each receiver includes a pair of parallel receiver boards, and each transmitter includes a pair of parallel transmitter boards and including:

disconnecting one of the receiver boards of each associated pair from its associated optical fibre and connecting the other receiver board of that pair to said associated optical fibre upon detection of a fault in said one receiver board, and disconnecting one of the associated transmitter boards from said single optical fibre and connecting the other transmitter board of that pair to said single optical fibre on detection of a fault in said one transmitter board.

* * * * *